United States Patent [19]

Hahn et al.

[11] Patent Number: 5,306,815
[45] Date of Patent: Apr. 26, 1994

[54] AZO DYES WITH A COUPLING COMPONENT OF THE QUINOLINE SERIES

[75] Inventors: Erwin Hahn, Heidelberg; Clemens Grund, Mannheim; Andreas Geisberger, Limburgerhof; Helmut Reichelt, Neustadt; Andreas Guldner, Weinheim; Mathias Wiesenfeldt, Mutterstadt; Karl-Heinz Etzbach, Frankenthal; Ruediger Sens, Mannheim; Helmut Hagen, Frankenthal, all of Fed. Rep. of Germany

[73] Assignee: BASF Aktiengesellschaft, Ludwigshafen, Fed. Rep. of Germany

[21] Appl. No.: 947,533

[22] Filed: Sep. 21, 1992

[30] Foreign Application Priority Data

Sep. 26, 1991 [DE] Fed. Rep. of Germany ....... 4132074

[51] Int. Cl.⁵ .................. C09B 29/033; C09B 29/44; D06P 1/18
[52] U.S. Cl. .................................. 534/752; 534/768; 503/227; 428/195
[58] Field of Search ............... 534/752, 768; 428/195; 503/227

[56] References Cited

U.S. PATENT DOCUMENTS

| 4,113,717 | 9/1978 | Parton | 534/768 X |
| 4,764,178 | 8/1988 | Gregory et al. | 503/227 X |
| 4,843,153 | 6/1989 | Eilingsfeld et al. | 534/752 |
| 5,037,798 | 8/1991 | Etzbach et al. | 428/195 X |
| 5,079,365 | 1/1992 | Sens et al. | 546/119 |
| 5,155,088 | 10/1992 | Evans et al. | 428/195 X |

FOREIGN PATENT DOCUMENTS

| 0251114 | 1/1988 | European Pat. Off. |
| 416434 | 3/1991 | European Pat. Off. |
| 53-24487 | 3/1978 | Japan | 534/768 |
| 53-65480 | 6/1978 | Japan | 534/768 |
| 53-65481 | 6/1978 | Japan |
| 53-141336 | 12/1978 | Japan | 534/768 |
| 59-204658 | 11/1984 | Japan | 534/768 |
| 60-239292 | 11/1985 | Japan | 534/768 |
| 3-256793 | 11/1991 | Japan | 534/768 |
| 1546803 | 5/1979 | United Kingdom |

OTHER PUBLICATIONS

Chemical Abstracts, vol. 89, No. 22, No. 181172p, Nov. 27, 1978, S. Imahori, et al., "Dyeing of Synthetic Fibers".
Chemical Abstracts, vol. 89, No. 14, No. 112334f, Oct. 2, 1978, S. Imahori et al., "Dyeing of Synthetic Fibers".
Chemical Abstracts, vol. 102, No. 16, No. 133543a, Apr. 22, 1985, "Monoazo Disperse Dyes for Polyester Fibers". JP-A-59-204-658.
Murata et al., Chemical Abstracts, vol. 116, No. 140252x (1992).
Niwa et al., Chemical Abstracts, vol. 104, No. 177829u (1986).

*Primary Examiner*—Mary C. Lee
*Assistant Examiner*—Fiona T. Powers
*Attorney, Agent, or Firm*—Oblon, Spivak, McClelland, Maier & Neustadt

[57] ABSTRACT

Azo dyes useful for dyeing or printing textile fibers or fabrics and for thermal transfer have the formula

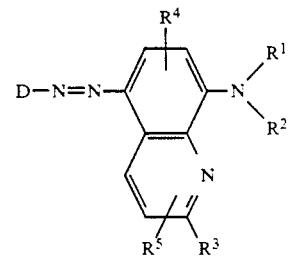

where
$R^1$ and $R^2$ are each substituted or unsubstituted $C_1$–$C_{10}$-alkyl or substituted or unsubstituted $C_3$–$C_4$-alkenyl or $R^1$ may also be hydrogen,
$R^3$ is hydrogen or $C_1$–$C_6$-alkyl,
$R^4$ and $R^5$ are each hydrogen, $C_1$–$C_6$-alkyl, halogen, $C_1$–$C_6$-alkoxy, amino or mono- or di($C_1$–$C_4$-alkyl)amino, and
D is a radical of the thiophene, thiazole, isothiazole, benzothiophene, thienothiophene or thienothiazole series.

4 Claims, No Drawings

AZO DYES WITH A COUPLING COMPONENT OF THE QUINOLINE SERIES

The present invention relates to novel azo dyes of the formula I

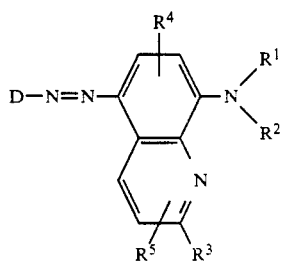

where
R¹ and R² are identical or different and each is independently of the other $C_1$-$C_{10}$-alkyl, which may be interrupted by 1 or 2 oxygen atoms in ether function and may be substituted by phenyl, cyano, $C_1$-$C_4$-alkoxycarbonyl, $C_1$-$C_4$-alkoxycarbonyloxy, hydroxyl or $C_1$-$C_4$-alkanoyloxy, or unsubstituted or chlorine-substituted $C_3$-$C_4$-alkenyl, or R¹ may also be hydrogen,
R³ is hydrogen or $C_1$-$C_6$-alkyl,
R⁴ and R⁵ are identical or different and each is independently of the other hydrogen, $C_1$-$C_6$-alkyl, halogen, $C_1$-$C_6$-alkoxy, amino or mono- or di($C_1$-$C_4$-alkyl)amino, and
D is a radical of the formula

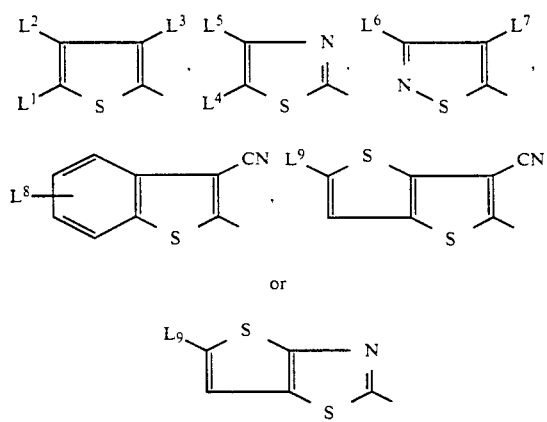

where
L¹ is cyano, $C_1$-$C_6$-alkanoyl, benzoyl, $C_1$-$C_4$-alkoxycarbonyl, $C_1$-$C_6$-alkylsulfonyl, substituted or unsubstituted phenylsulfonyl or a radical of the formula —CH=C(CN)₂ or —CH=C(CN)—COOX, where X is $C_1$-$C_4$-alkyl,
L² is halogen, unsubstituted or phenyl- or $C_1$-$C_4$-alkoxy-substituted $C_1$-$C_6$-alkoxy, substituted or unsubstituted phenoxy, unsubstituted or phenyl-substituted $C_1$-$C_6$-alkylthio, substituted or unsubstituted phenylthio, $C_1$-$C_6$-alkylsulfonyl, substituted or unsubstituted phenylsulfonyl or $C_1$-$C_4$-alkoxycarbonyl,
L³ is cyano or $C_1$-$C_4$-alkoxycarbonyl,
L⁴ is cyano, $C_1$-$C_6$-alkanoyl, benzoyl, $C_1$-$C_6$-alkylsulfonyl, substituted or unsubstituted phenylsulfonyl or a radical of the formula —CH=C(CN)₂ or —CH=C(CN)—COOX, where X is $C_1$-$C_4$-alkyl,
L⁵ is hydrogen, $C_1$-$C_6$-alkyl, halogen, unsubstituted or phenyl- or $C_1$-$C_4$-alkoxy-substituted $C_1$-$C_6$-alkoxy, unsubstituted or phenyl-substituted $C_1$-$C_6$-alkylthio, substituted or unsubstituted phenylthio, $C_1$-$C_6$-alkylsulfonyl, substituted or unsubstituted phenylsulfonyl or $C_1$-$C_4$-alkoxycarbonyl,
L⁶ is cyano, unsubstituted or phenyl-substituted $C_1$-$C_6$-alkyl, $C_1$-$C_6$-alkylthio, substituted or unsubstituted phenyl, thienyl, $C_1$-$C_4$-alkylthienyl, pyridyl or $C_1$-$C_4$-alkylpyridyl,
L⁷ is cyano, $C_1$-$C_4$-alkoxycarbonyl, halogen or thiocyanato,
L⁸ is hydrogen, cyano or halogen and
L⁹ is $C_1$-$C_6$-alkanoyl or $C_1$-$C_4$-alkoxycarbonyl, and the use thereof for dyeing or printing textile fibers or fabrics or for thermal transfer.

JP-A-65 481/1978 discloses azo dyes whose diazo components are derived from 2-aminothiophenes and whose coupling components are derived from 8-aminoquinolines. However, it has been found that the dyes mentioned therein still have defects in their application properties.

It is an object of the present invention to provide novel azo dyes which likewise have a coupling component of the 8-aminoquinoline series and whose diazo component is a member of the heterocyclic series. The novel dyes shall be characterized by an advantageous application property profile.

We have found that this object is achieved by the azo dyes of the formula I defined at the beginning.

Substituted phenyl appearing in the radicals of the abovementioned formula I may have for example $C_1$-$C_4$-alkyl, $C_1$-$C_4$-alkoxy or halogen, in particular chlorine or bromine, as substituents. If substituted, the phenyl rings will in general have from 1 to 3 substituents.

Any alkyl or alkenyl appearing in the above-mentioned formulae may be either straight-chain or branched.

R¹, R², R³, R⁴, R⁵, L⁵ and L⁶ are each for example methyl, ethyl, propyl, isopropyl, butyl, isobutyl, sec-butyl, pentyl, isopentyl, neopentyl, tert-pentyl, hexyl or 2-methylpentyl.

R¹, R² and L⁶ may each also be benzyl or 1- or 2-phenylethyl.

L², L⁵ and L⁶ may each also be for example methylthio, ethylthio, propylthio, isopropythio, butylthio, isobutylthio, pentylthio, hexylthio, benzylthio, 1- or 2-phenylethylthio, phenylthio, 2-methylphenylthio, 2-methoxyphenylthio or 2-chlorophenylthio.

L² and L⁵ and also R⁴ and R⁵ may each also be for example methoxy, ethoxy, propoxy, isopropoxy, butoxy, isobutyoxy, sec-butoxy, pentyloxy, isopentyloxy, neopentyloxy, tert-pentyloxy, hexyloxy or 2-methylpentyloxy.

R⁴, R⁵, L² and L⁵ and also L⁷ and L⁸ may each also be for example fluorine, chlorine or bromine.

L¹, L² and L⁵ and also L⁴ may each also be for example methylsulfonyl, ethylsulfonyl, propylsulfonyl, isopropylsulfonyl, butylsulfonyl, isobutylsulfonyl, sec-butylsulfonyl, pentylsulfonyl, isopentylsulfonyl, neopentylsulfonyl, hexysulfonyl, phenylsulfonyl, 2-methylphenylsulfonyl, 2-methoxyphenylsulfonyl or 2-chlorophenylsulfonyl.

L¹, L², L⁵ and L⁷ and also L³ and L⁹ may each also be for example methoxycarbonyl, ethoxycarbonyl, propoxycarbonyl, isopropoxycarbonyl, butoxycarbonyl, isobutoxycarbonyl or sec-butoxycarbonyl.

$L^2$ and $L^5$ may each also be for example 2-methoxyethoxy, 2-ethoxyethoxy, 2- or 3-methoxypropoxy, 2- or 3-ethoxypropoxy, 2- or 4-methoxybutyoxy, 2- or 4-ethoxybutoxy, 5-methoxypentyloxy, 5-ethoxypentyloxy, 6-methoxyhexyloxy, 6-ethoxyhexyloxy, benzyloxy or 1- or 2-phenylethoxy.

$R^4$ and $R^5$ may each also be for example mono- or dimethylamino, mono- or diethyamino, mono, or dipropylamino, mono- or diisopropylamino, mono- or dibutylamino or N-methyl-N-ethylamino.

$L^6$ may also be for example phenyl, 2-, 3- or 4-methylphenyl, 2,4-dimethylphenyl, 2-, 3- or 4-chlorphenyl, 2-, 3- or 4-methoxyphenyl, 2- or 3-methylthienyl or 2-, 3- or 4-methylpyridyl.

$L^1$, $L^4$ and $L^9$ may each also be for example formyl, acetyl, propionyl, butyryl, isobutylryl, pentanoyl or hexanoyl.

$R^1$ and $R^2$ may each also be for example heptyl, octyl, 2-ethylhexyl, isooctyl, nonyl, isononyl, decyl, cyanomethyl, 2-cyanoethyl, 3-cyanopropyl, 2-cyanobutyl, 4-cyanobutyl, 5-cyanopentyl, 6-cyanohexyl, 2-hydroxyethyl, 2-hydroxypropyl, 3-hydroxypropyl, 2-hydroxybutyl, 4-hydroxybutyl, 5-hydroxypentyl, 6-hydroxyhexyl, 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxypropyl, 2- or 3-butoxypropyl, 2- or 4-methoxybutyl, 2- or 4-ethoxybutyl, 2- or 4-propoxybutyl, 2- or 4-butoxybutyl, 3,6-dioxaheptyl, 3,6-dioxaoctyl, 4,8-dioxanonyl, 3,7-dioxaotyl, 3,7-dioxanonyl, 4,7-dioxaoctyl, 4,7-dioxanonyl, 4,8-dioxadecyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbuty, 5-methoxycarbonylpentyl, 5-ethoxycarbonylpentyl, 6-methoxycarbonylhexyl, 6-ethoxycarbonylhexyl, 2-methoxycarbonyloxyethyl, 2-ethoxycarbonyloxyethyl, 2- or 3-methoxycarbonyloxypropyl, 2- or 3-ethoxycarbonyloxypropyl, 2-acetyloxyethyl, 2-propionyloxyethyl, 2- or 3-acetyloxypropyl, 2- or 3-propoxyloxypropyl, 2- or 4-acetyloxybutyl, 2- or 4-propionyloxybutyl, prop-2-en-1-yl, but-2-en-1-yl, 2-methylprop-2-en-1-yl, 3-chloroprop-2-en-1-yl or 4-chlorobut-2-en-1-yl.

Preference is given to azo dyes of the formula I where $R^3$ is hydrogen or methyl and $R^4$ and $R^5$ are each hydrogen.

Preference is further given to azo dyes of the formula I where D is a radical of the formula

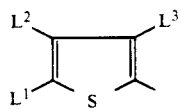

where $L^1$, $L^2$ and $L^3$ are each as defined above.

Particular preference is given to azo dyes of the formula I where $R^1$ is hydrogen, $R^2$ is $C_1$-$C_{10}$-alkyl, which may be interrupted by 1 oxygen atom in ether function and may be substituted by phenyl, cyano, $C_1$-$C_4$-alkoxycarbonyl or hydroxyl, $R^3$ is hydrogen or methyl, and $R^4$ and $R^5$ are each hydrogen.

Particular preference is further given to azo dyes of the formula I where D is a radical of the formula

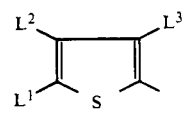

where
$L^1$ is cyano, formyl or a radical of the formula $-CH=C(CN)_2$ or $-CH=C(CN)-COOX$, where X is as defined above,
$L^2$ is chlorine or $C_1$-$C_4$-alkoxycarbonyl, and
$L^3$ is cyano or $C_1$-$C_4$-alkoxycarbonyl.

Of particular interest are azo dyes of the formula I where D is the radical of the formula

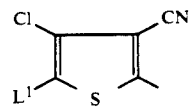

where
$L^1$ is formyl or a radical of the formula $-CH=C(CN)_2$ or $-CH=C(CN)-COOX$, where X is as defined above.

The novel azo dyes of the formula I can be obtained in a conventional manner, for example by diazotizing an amine of the formula II $$D-NH_2 \qquad (II)$$

where D is as defined above, in a conventional manner and coupling it with a coupling component of the formula III

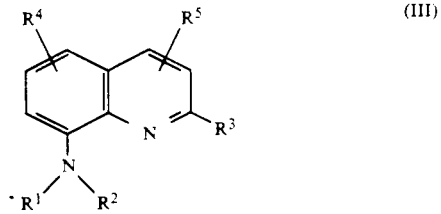

(III)

where $R^1$, $R^2$, $R^3$, $R^4$ and $R^5$ are each as defined above.

When $L^1$ or $L^4$ is the radical $-CH=C(CN)_2$ or $-CH=C(CN)-COOX$, the diazotization is carried out with those 2-aminothiophene or 2-aminothiazole derivatives which already contain these groups in the molecule or it is carried out with the corresponding formyl derivatives and, after the coupling reaction, followed by condensing with malodinitrile or $C_1$-$C_4$-alkyl cyanoacetate.

The amines of the formula II and the coupling components of the formula III are in general compounds known per se. Diazo components of the aminothienothiophene or aminothienothiazole series are described for example in U.S. Pat. No. 4,843,153 or GB-A-1 546 803.

The azo dyes of the formula I according to the present invention are advantageously useful as disperse dyes for dyeing or printing textile fibers or fabrics, in particular polyesters, but also fibers or fabrics made of cellulose esters or polyamides or blend fabrics composed of polyester and cellulose fibers.

To obtain a favorable color buildup it can be advantageous in some cases to use mixtures of the dyes of the formula I with one another.

The novel azo dyes are characterized by high color strength, good fastness properties and brilliant hues.

The azo dyes according to the present invention are also advantageously useful for thermal transfer from a transfer to a plastic-coated paper by means of an energy source (see for example EP-A-416 434).

The invention will now be more particularly described by the following Examples:

EXAMPLE 1 a) 4.40 g (0.02 mol) of 2-amino-3-cyano-4-chloro-5-formylthiophene were dissolved in 20 ml of 96% by weight sulfuric acid, and the solution was stirred at from 25° to 30° C. for 1 hour. 6.60 g of nitrosylsulfuric acid (11.5% of $N_2O_3$) were then added dropwise at from 0° to 5° C., and the mixture was stirred at from 0° to 5° C. for 2.5 hours.

b) 5.40 g (0.021 mol) of 2-methyl-8-(2-methoxycarbonylethylamino)quinoline were dissolved in 500 ml of water and 5 ml of 96% by weight sulfuric acid, introduced as initial charge together with 0.50 g of amidosulfuric acid and 300 g of ice and admixed at not more than 5° C. with the diazonium salt solution described under a). After the coupling reaction had ended, the dye was filtered off with suction at 60° C., washed neutral and dried. This gave 8.00 g (90.6% of theory) of the dye of the formula

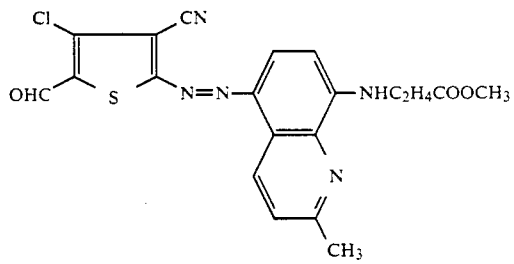

which dyes polyester fibers in a fast blue shade.

EXAMPLE 2 a) 4.60 g (0.025 mol) of 2-amino-3,5-dicyano-4-chlorothiophene in 100 ml of 3:1 (v/v) of glacial acetic acid/propionic acid and 25 ml of 85% by weight sulfuric acid were admixed at not more than 5° C. with 6.80 g of nitrosylsulfuric acid (11.5% of $N_2O_3$) and the mixture was stirred at from 0° to 5° C. for 3 hours.

b) 7.10 g (0.027 mol) of 2-methyl-8-(2-methoxycarbonylethylamino)quinoline were dissolved in 500 ml of water and 5 ml of 96% by weight sulfuric acid, introduced as initial charge together with 0.50 g of amidosulfuric acid and 300 g of ice and admixed at not more than 5° C. with the diazonium salt solution described under a). After the coupling reaction had ended, the dye was filtered off with suction at 60° C., washed neutral and dried. This gave 8.0 g (90.6% of theory) of the dye of the formula

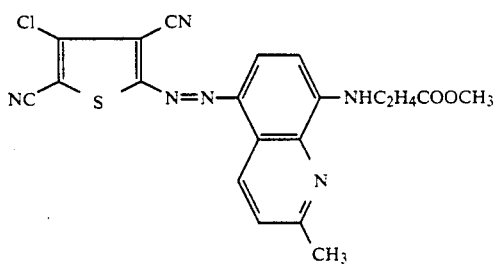

which dyes polyester in a blue shade.

The procedures of Examples 1 and 2 are followed to obtain the dyes listed in the following Tables 1 to 3:

TABLE 1

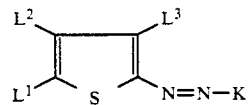

| Example No. | $L^1$ | $L^2$ | $L^3$ | K | Color on polyester |
|---|---|---|---|---|---|
| 3 | CHO | Cl | CN | ![quinoline with NHC2H5] | blue |
| 4 | CHO | Cl | CN | ![quinoline with NHCH2CHC6H5, OH] | blue |

TABLE 1-continued

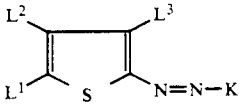

| Example No. | L¹ | L² | L³ | K | Color on polyester |
|---|---|---|---|---|---|
| 5 | CHO | Cl | CN | 5-methyl-8-(NHCH₃)-2-methylquinoline | blue |
| 6 | CHO | Cl | CN | 5-methyl-8-(NHCH₂CHCH₂OCH(CH₃)₂)-2-methylquinoline, with OH on middle C | blue |
| 7 | CHO | Cl | CN | 5-methyl-8-(NHC₂H₄CN)-2-methylquinoline | blue |
| 8 | CHO | Cl | CN | 5-methyl-8-N(CH₃)₂-2-methylquinoline | blue |
| 9 | CHO | Cl | CN | 5-methyl-8-(NHCH₂CHCH₂OCH(CH₃))quinoline, with OH on middle C | blue |
| 10 | CHO | Cl | CN | 5-methyl-8-(NHC₂H₄COOCH₃)quinoline | blue |

TABLE 1-continued
$$\underset{L^1}{\overset{L^2}{\diagdown}} \underset{S}{\diagdown} \underset{}{\overset{L^3}{\diagup}} N=N-K$$
| Example No. | $L^1$ | $L^2$ | $L^3$ | K | Color on polyester |
|---|---|---|---|---|---|
| 11 | CHO | Cl | CN | 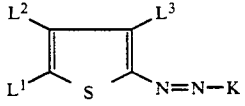 | blue |
| 12 | CHO | Cl | CN | 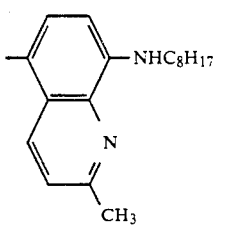 | blue |
| 13 | CHO | Cl | CN | 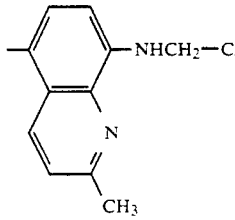 | blue |
| 14 | CHO | Cl | CN | 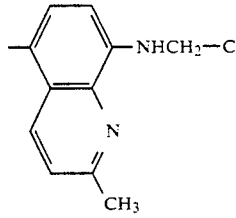 | blue |
| 15 | CHO | Cl | CN | 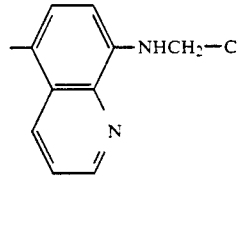 | blue |
| 16 | CHO | Cl | CN | 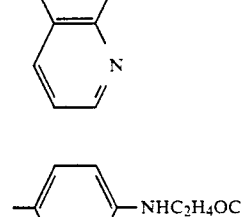 | blue |

TABLE 1-continued

Structure: L¹ and L² on thiophene ring with L³, connected via N=N-K

| Example No. | L¹ | L² | L³ | K | Color on polyester |
|---|---|---|---|---|---|
| 17 | CHO | Cl | CN | 2-methyl-8-(NHC₂H₄OC₄H₉)-quinoline | blue |
| 18 | CHO | Cl | CN | 2-methyl-8-(NHCH(CH₃)CH₂OH)-quinoline | blue |
| 19 | CN | Cl | CN | 8-(NHCH(CH₃)CH₂OH)-quinoline | blue |
| 20 | CN | Cl | CN | 2-methyl-8-(NHC₂H₄COOCH₃)-quinoline | blue |
| 21 | CN | Cl | CN | 2-methyl-8-(NHC₂H₄CN)-quinoline | blue |
| 22 | CH₃OOC | CH₃OOC | CN | 2-methyl-8-(NHCH₂CH(OH)CH₂OCH(CH₃)₂)-quinoline | blue |

TABLE 1-continued
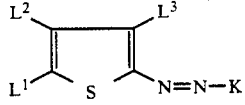
| Example No. | L¹ | L² | L³ | K | Color on polyester |
|---|---|---|---|---|---|
| 23 | CH₃OOC | CH₃OOC | CN | 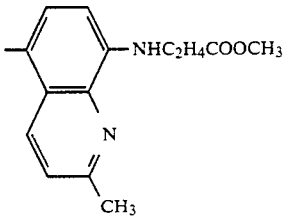 | blue |
| 24 | CH₃OOC | CH₃OOC | CN | 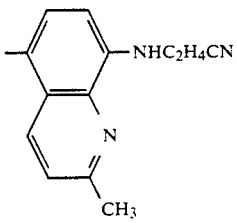 | reddish blue |
| 25 | CN | Cl | CN | 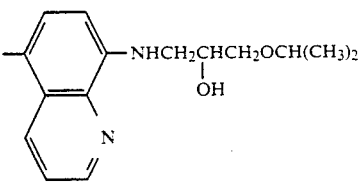 | blue |
| 26 | CHO | Cl | CN | 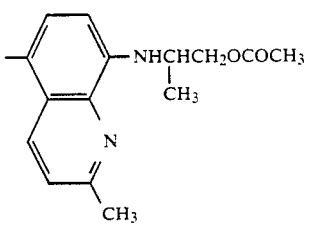 | blue |
| 27 | CN | Cl | CN | 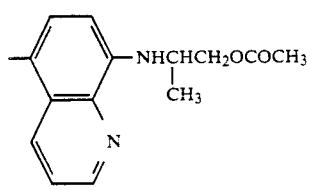 | blue |
| 28 | CN | Cl | CN | 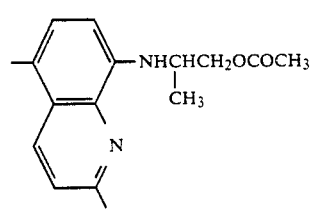 | blue |

TABLE 1-continued
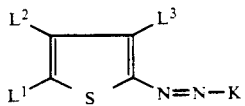
| Example No. | L¹ | L² | L³ | K | Color on polyester |
|---|---|---|---|---|---|
| 29 | CN | Cl | CN | 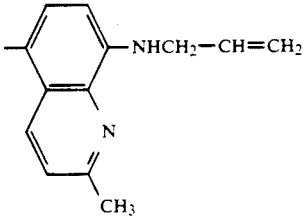 | blue |
| 30 | CN | Cl | CN | 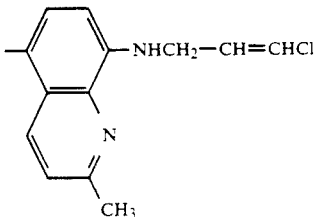 | blue |
| 31 | CN | Cl | CN | 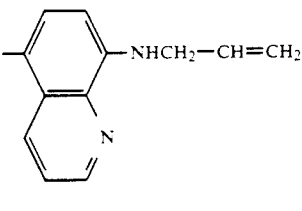 | blue |
| 32 | CN | Cl | CN | 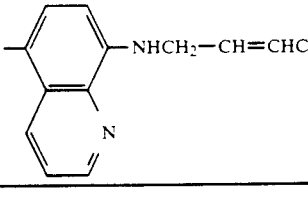 | blue |
TABLE 2
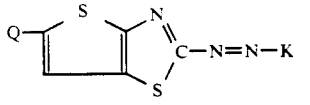
| Example No. | Q | K | Color on polyester |
|---|---|---|---|
| 33 | $CH_3CO$ | 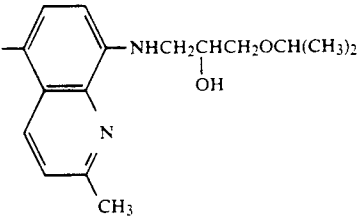 | blue |

TABLE 2-continued
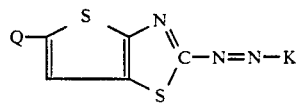
| Example No. | Q | K | Color on polyester |
|---|---|---|---|
| 34 | CH₃CO | 5-methyl-8-(NHC₂H₄COOCH₃)-2-methylquinolin-yl | blue |
| 35 | CH₃CO | 5-methyl-8-(NHC₂H₄CN)-2-methylquinolin-yl | blue |
| 36 | C₂H₅OOC | 5-methyl-8-(NHC₂H₄COOCH₃)-2-methylquinolin-yl | blue |
| 37 | C₂H₅OOC | 5-methyl-8-(NHCH₂CH(OH)CH₂OCH(CH₃)₂)-2-methylquinolin-yl | blue |
| 38 | C₂H₅OOC | 5-methyl-8-(NHC₂H₄OC₂H₅)-2-methylquinolin-yl | blue |

TABLE 3

[Structure: thieno[2,3-d]thiazole with Q substituent, CN group, and C—N=N—K azo linkage]

| Example No. | Q | K | Color on polyester |
|---|---|---|---|
| 39 | CH$_3$CO | 5-methyl-2-methylquinolin-8-yl with NHC$_2$H$_4$COOCH$_3$ | blue |
| 40 | CH$_3$CO | 5-methyl-2-methylquinolin-8-yl with NHCH$_2$CH(OH)CH$_2$OCH(CH$_3$)$_2$ | blue |
| 41 | CH$_3$CO | 5-methyl-2-methylquinolin-8-yl with NHC$_2$H$_4$OC$_2$H$_5$ | blue |
| 42 | CH$_3$CO | 5-methyl-2-methylquinolin-8-yl with NHC$_2$H$_4$OC$_4$H$_9$ | blue |
| 43 | CH$_3$OOC | 5-methyl-2-methylquinolin-8-yl with NHC$_2$H$_4$COOCH$_3$ | blue |
| 44 | CH$_3$OOC | 5-methyl-2-methylquinolin-8-yl with NHCH$_2$CH(OH)CH$_2$OCH(CH$_3$)$_2$ | blue |

TABLE 3-continued

[Structure with CN, S, Q, C=N—N—K]

| Example No. | Q | K | Color on polyester |
|---|---|---|---|
| 45 | CH₃OOC | [quinoline with NHC₂H₄OC₂H₅ and CH₃] | blue |
| 46 | CH₃OOC | [quinoline with NHC₂H₄OC₄H₉ and CH₃] | blue | p The diazo components of the dyes listed above in Table 2 were obtained as follows:

EXAMPLE 47

81.2 g of 2-amino-4-chloro-5-formylthiazole were dissolved in 400 ml of N,N-dimethylformamide. 60 g of potassium carbonate were added, followed at room temperature by 54.6 ml of ethyl thioglycolate, added dropwise. After the exothermic reaction had ceased, the reaction mixture was stirred at 60° C. for 3 hours. It was then discharged onto 1.5 l of ice-water, and the precipitate was filtered off with suction, washed with water and dried under reduced pressure at 50° C. This gave 79.8 g (70% of theory) of the compound of the formula

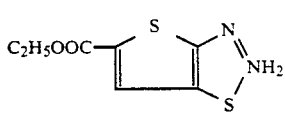

of melting point 98° C.

The same method can be used to obtain the corresponding methoxycarbonyl compound (mp. 238° C.) or the acetyl compound (mp. 259°–60° C.).

EXAMPLE 48 a) 6.40 g (0.025 mol) of 3-benzyl-4-cyano-5-aminoisothiazole were added at 35° C. to a mixture of 13.0 g of ice and 35.0 g of 96% by weight sulfuric acid. After 8.0 g of nitrosylsulfuric acid (11.5% of N₂O₃) had been added, the mixture was stirred at from 0° to 5° C. for 3 hours.

b) 6.0 g (0.028 mol) of 2-methyl-8-(2-cyanoethylamino)quinoline were dissolved in 500 ml of water and 5 ml of 96% by weight sulfuric acid, introduced as initial charge together with 0.50 g of amidosulfuric acid and 300 g of ice and admixed at not more than 5° C. with the diazonium salt solution described under a). After the coupling reaction had ended, the dye was filtered off with suction at from 40° to 60° C., washed neutral and dried. This gave 7.6 g (70% of theory) of the dye of the formula.

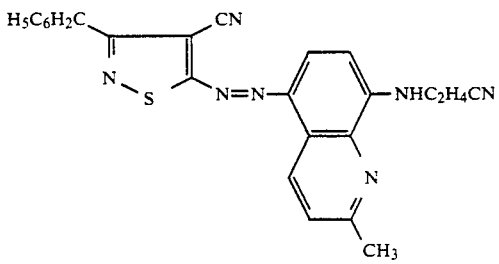

in the form of a black powder (mp. 201°–204° C.). The dye gives a light-fast violet shade on polyester fibers.

The same method can be used to obtain the dyes listed in the following Tables 4 and 5:

TABLE 4
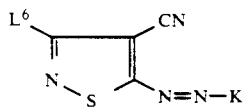
| Example No. | $L^6$ | K | Color on polyester |
|---|---|---|---|
| 49 | $H_5C_6CH_2$ | 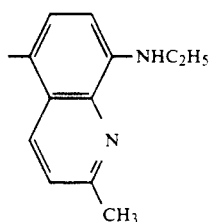 | violet |
| 50 | $H_5C_6CH_2$ | 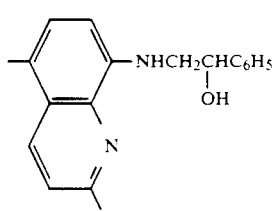 | violet |
| 51 | $H_5C_6CH_2$ | 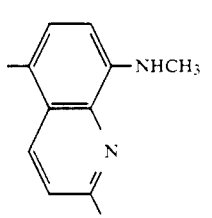 | violet |
| 52 | $H_5C_6CH_2$ | 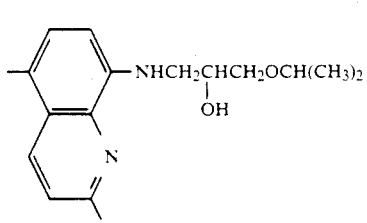 | violet |
| 53 | $H_5C_6CH_2$ | 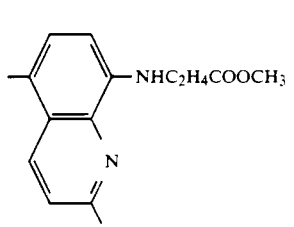 | violet |
| 54 | $H_5C_6CH_2$ | 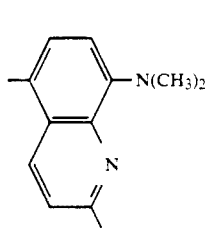 | violet |

TABLE 4-continued
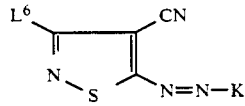
| Example No. | L⁶ | K | Color on polyester |
|---|---|---|---|
| 55 | $C_6H_5$ | 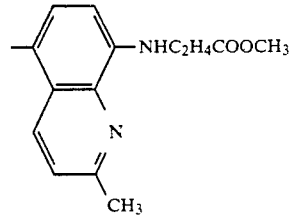 | violet |
| 56 | $i\text{-}C_3H_7$ | 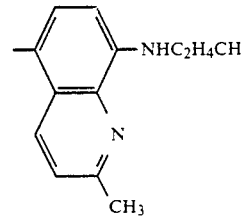 | violet |
| 57 | $i\text{-}C_3H_7$ | 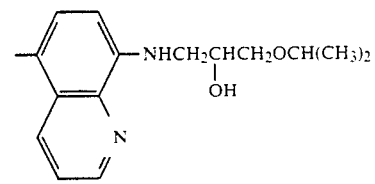 | violet |
TABLE 5
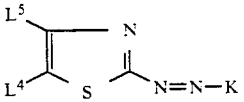
| Example No. | L⁴ | L⁵ | K | Color on polyester |
|---|---|---|---|---|
| 58 | CHO | Cl | 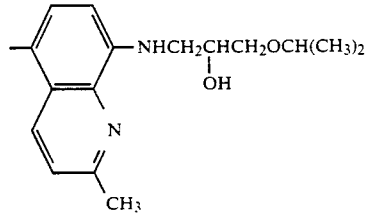 | blue |
| 59 | CHO | Cl | 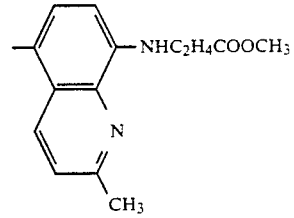 | blue |

TABLE 5-continued
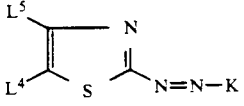
| Example No. | $L^4$ | $L^5$ | K | Color on polyester |
|---|---|---|---|---|
| 60 | CHO | Cl | 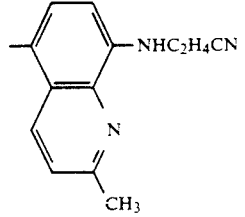 | blue |
| 61 | CHO | Cl | 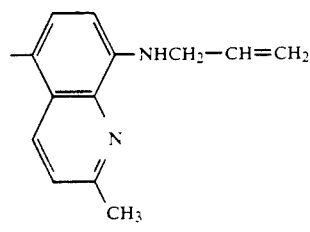 | blue |
| 62 | CHO | Cl | 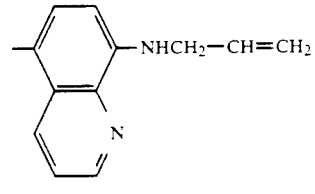 | blue |
| 63 | CN | $CH_3OOC$ | 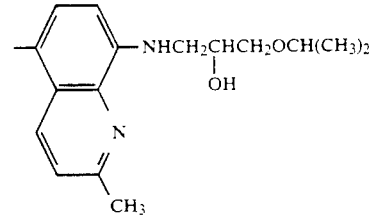 | violet |
| 64 | CN | $CH_3OOC$ | 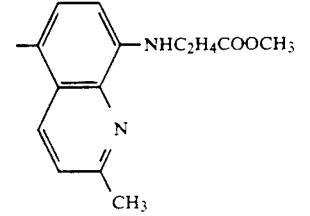 | violet |
| 65 | CN | $CH_3OOC$ | 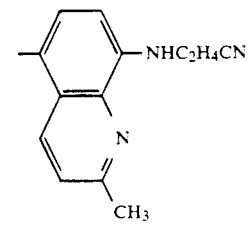 | violet |

TABLE 5-continued

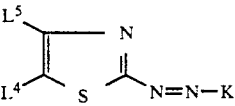

| Example No. | $L^4$ | $L^5$ | K | Color on polyester |
|---|---|---|---|---|
| 66 | CN | Cl | ![structure] 8-(NHCH$_2$CHCH$_2$OCH(CH$_3$)$_2$)-2-methylquinoline with OH on middle carbon | reddish blue |
| 67 | CN | Cl | 8-(NHC$_2$H$_4$COOCH$_3$)-2-methylquinoline | reddish blue |
| 68 | CN | Cl | 8-(NHC$_2$H$_4$CN)-2-methylquinoline | reddish blue |
| 69 | CHO | Cl | 8-(NHC$_2$H$_4$OC$_2$H$_5$)-2-methylquinoline | blue |
| 70 | CHO | Cl | 8-(NHC$_2$H$_4$OC$_4$H$_9$)-2-methylquinoline | blue |
| 71 | CHO | Cl | 8-(NHCHCH$_2$OH)-2-methylquinoline with CH$_3$ on middle carbon | blue |

TABLE 5-continued
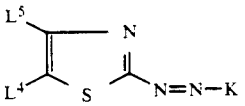
| Example No. | L⁴ | L⁵ | K | Color on polyester |
|---|---|---|---|---|
| 72 | CN | Cl | 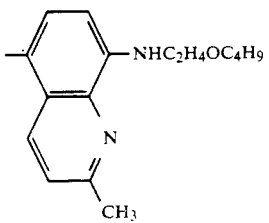 | blue |
| 73 | CN | Cl | 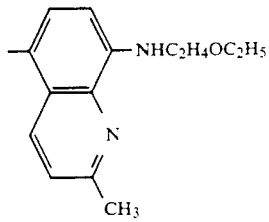 | blue |
| 74 | CN | Cl | 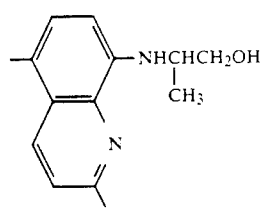 | blue |
| 75 | CHO | Cl | 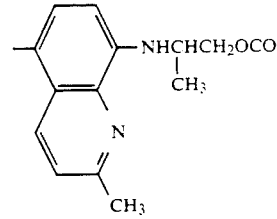 | blue |
| 76 | CN | Cl | 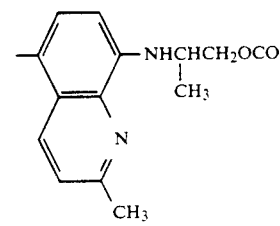 | blue |
| 77 | CHO | Cl | 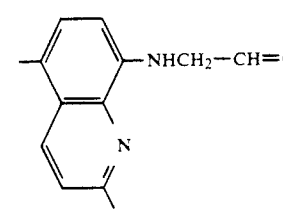 | blue |

TABLE 5-continued

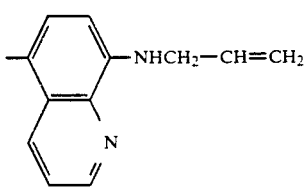

| Example No. | L⁴ | L⁵ | K | Color on polyester |
|---|---|---|---|---|
| 78 | CN | Cl | (structure: quinoline with —NHCH₂—CH=CH₂) | blue |

EXAMPLE 79

2.36 g (0.005 mol) of the dye of Example 6 were dissolved in 20 ml of glacial acetic acid, admixed with 0.40 g (0.006 mol) of malodinitrile and heated at 80° C. for 1 hour. Then 20 ml of water were added, the mixture was stirred for 15 minutes, and the precipitate was filtered off with suction, washed with 50 ml of 50% by weight aqueous acetic acid and then with water and dried under reduced pressure at 50° C. This gave 2.45 g of the dye of the formula

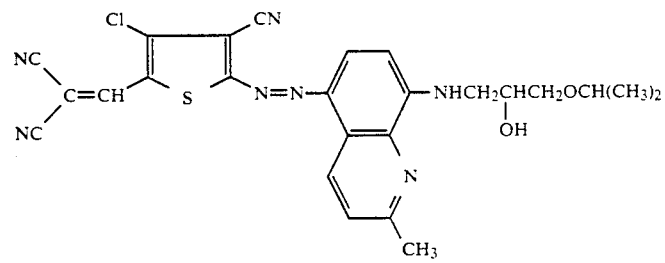

in the form of a greenish powder which dyes polyester fibers in a greenish blue shade.

EXAMPLE 80 a) 66 g (0.3 mol) of 2-amino-3-cyano-4-chloro-5-formylthiophene were dissolved in 500 ml of glacial acetic acid, admixed with 23.80 g (0.36 mol) of malodinitrile and heated at 118° C. for 6.5 hours. The mixture was then cooled down and filtered with suction at room temperature. Washing the filter residue with 100 ml of glacial acetic acid, washing neutral with water and drying at 40° C. under reduced pressure left 72.1 g of the diazo component of the formula

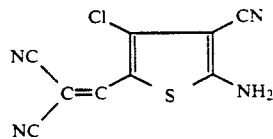

b) 5.90 g (0.025 mol) of the 2-amino-3-cyano-4-chloro-5-(2,2-dicyanovinyl)thiophene described under a) were dissolved in 100 ml of 3:1 (v/v) glacial acetic acid/propionic acid and 20 ml of 85% by weight sulfuric acid, admixed at from 0° to 5° C. with 7.8 g of nitrosylsulfuric acid (11.5% of N₂O₃) and stirred at from 0° to 5° C. for 2 hours.

c) 8.00 g (0.035 mol) of 2-methyl-8-(2-methoxycarbonylethylamino)quinoline were dissolved in 150 ml of water and 2 ml of 96% by weight sulfuric acid and admixed with 0.5 g of amidosulfuric acid and also 300 g of ice. The diazonium salt solution described under b) was added dropwise at from 0° to 5° C. in the course of 10 minutes. After the coupling reaction had ended, the dye was filtered off with suction at 60° C., washed neutral and dried under reduced pressure at 50° C. This gave 7.70 g of the dye of the formula

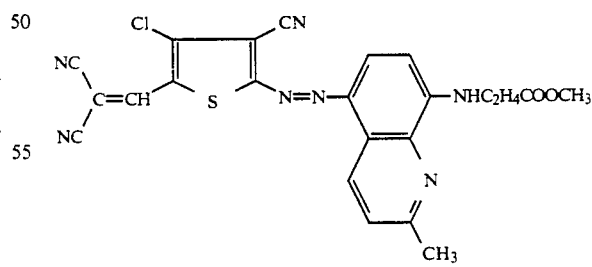

which dyes polyester fibers in a greenish blue shade.

The procedures of Examples 79 and 80 are followed to obtain the dyes listed in the following Table 6:

TABLE 6

[Structure: thiophene ring with Cl, CN, T¹T²C=CH– substituents, and –N=N–K azo group]

| Example No. | T¹ | T² | K | Color on polyester |
|---|---|---|---|---|
| 81 | CN | CN | 8-(NHC₂H₄CN)-2-methyl-5-methylquinoline | greenish blue |
| 82 | CN | C₂H₅OOC | 8-[NHCH₂CHCH₂OCH(CH₃)₂]-2-methyl-5-methylquinoline, with OH on middle CH | greenish blue |
| 83 | CN | C₂H₅OOC | 8-(NHC₂H₄COOCH₃)-2-methyl-5-methylquinoline | greenish blue |
| 84 | CN | C₂H₅OOC | 8-(NHC₂H₄CN)-2-methyl-5-methylquinoline | greenish blue |
| 85 | CN | C₄H₉OOC | 8-[NHCH₂CH(C₂H₅)C₄H₉]-2-methyl-5-methylquinoline | greenish blue |
| 86 | CN | CN | 8-(NHC₈H₁₇)-2-methyl-5-methylquinoline | greenish blue |

Transfer of dyes (use)
General method:

a) 10 g of dye are stirred at 20° C. into 100 g of a 10% by weight solution of a binder (Vylon® 290 from Toyobo) in 4.5:2:2 v/v/v methyl ethyl ketone/toluene/cyclohexanone.

The printing ink is applied with a 6 μm draw bar to a 6 μm thick polyester film coated on the back with a suitable slipping layer and dried with a hair dryer in the course of 1 minute. Before the color ribbon can be printed, it has to afterdry in air for at least 24 hours, since residual solvent can have an adverse effect on the printing process.

b) The color ribbons are printed onto Hitachi VY-S video print paper in a computer-controlled experimental arrangement equipped with a commercial thermal head.

By varying the voltage it is possible to control the energy emitted by the thermal head, the pulse duration setting being 7 ms and only one pulse being emitted at any one time. The emitted energy is within the range from 0.71 to 1.06 mJ/dot.

Since the depth of shade is directly proportional to the supplied energy, a color wedge can be produced and evaluated spectroscopically.

A plot of the depth of shade versus the supplied energy is used to determine the Q* value (=energy in mJ/dot for the absorbance value 1) and the slope m in 1/mJ.

The results obtained are listed in the following Table 7:

TABLE 7

| Example No. | Dye No. | $\lambda_{max}$ [nm] (measured in $CH_2Cl_2$) | Q* [mJ/dot] | m [1/mJ] |
|---|---|---|---|---|
| 87 | 3 | 623 | 0.99 | 2.10 |
| 88 | 11 | 622 | 0.94 | 2.34 |
| 89 | 6 | 616 | 1.31 | 1.32 |
| 90 | 1 | 609 | 1.36 | 1.20 |
| 91 | 7 | 595 | 1.78 | 0.83 |
| 92 | 16 | 616 | 1.54 | 1.04 |
| 93 | 17 | 616 | 1.22 | 1.41 |
| 94 | 85 | 672 | 1.08 | 2.06 |
| 95 | 86 | 692 | 1.17 | 1.73 |

We claim:
1. An azo dye of the formula I

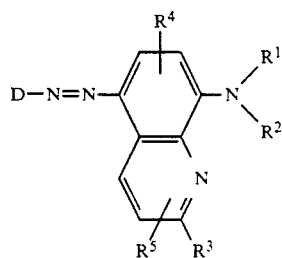

where
$R^1$ and $R^2$ are identical or different and each is independently of the other $C_1$-$C_{10}$-alkyl, which may be interrupted by 1 or 2 oxygen atoms in ether function and may be substituted by phenyl, cyano, $C_1$-$C_4$-alkoxycarbonyl, $C_1$-$C_4$-alkoxycarbonyloxy, hydroxyl or $C_1$-$C_4$-alkanoyloxy, or unsubstituted or chlorine-substituted $C_3$-$C_4$-alkenyl, or $R^1$ may also be hydrogen,
$R^3$ is hydrogen or $C_1$-$C_8$-alkyl,
$R^4$ and $R^5$ are identical or different and each is independently of the other hydrogen, $C_1$-$C_6$-alkyl, halogen, $C_1$-$C_6$-alkoxy, amino or mono- or di($C_1$-$C_4$-alkyl)amino, and
D is a radical of the formula

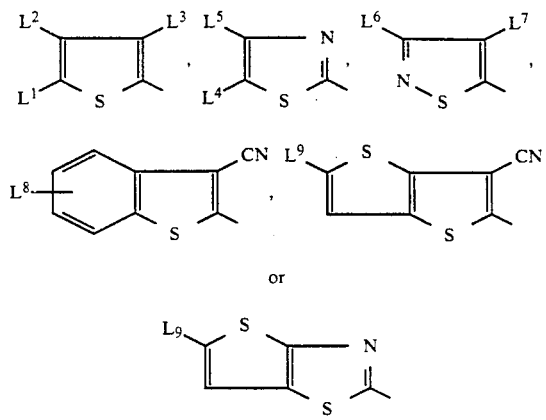

or

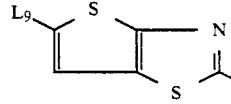

where
$L^1$ is cyano, $C_1$-$C_6$-alkanoyl, benzoyl, $C_1$-$C_4$-alkoxycarbonyl, $C_1$-$C_6$-alkylsulfonyl, substituted or unsubstituted phenylsulfonyl or a radical of the formula $-CH=C(CN)_2$ or $-CH=C(CN)-COOX$, where X is $C_1$-$C_4$-alkyl,
$L^2$ is halogen,
$L^3$ is cyano or $C_1$-$C_4$-alkoxycarbonyl,
$L^4$ is cyano, $C_1$-$C_6$-alkanoyl, benzoyl, $C_1$-$C_6$-alkylsulfonyl, substituted or unsubstituted phenylsulfonyl or a radical of the formula $-CH=C(CN)_2$ or $-CH=C(CN)-COOX$, where X is $C_1$-$C_4$-alkyl,
$L^5$ is hydrogen, $C_1$-$C_6$-alkyl, halogen, unsubstituted or phenyl- or $C_1$-$C_4$-alkoxy-substituted $C_1$-$C_6$-alkoxy, unsubstituted or phenyl-substituted $C_1$-$C_6$-alkylthio, substituted or unsubstituted phenylthio, $C_1$-$C_6$-alkylsulfonyl, substituted or unsubstituted phenylsulfonyl or $C_1$-$C_4$-alkoxycarbonyl,
$L^6$ is cyano, unsubstituted or phenyl-substituted $C_1$-$C_6$ alkyl, $C_1$-$C_6$-alkylthio, substituted or unsubstituted phenyl thienyl, $C_1$-$C_4$-alkylthienyl, pyridyl or $C_1$-$C_4$-alkylpyridyl,
$L^7$ is cyano, $C_1$-$C_4$-alkoxycarbonyl, halogen or thiocyanato,
$L^8$ is hydrogen, cyano or halogen and
$L^9$ is $C_1$-$C_6$-alkanoyl or $C_1$-$C_4$-alkoxycarbonyl.

2. An azo dye as claimed in claim 1, wherein $R^3$ is hydrogen or methyl and $R^4$ and $R^5$ are each hydrogen.

3. An azo dye as claimed in claim 1, wherein D is a radical of the formula

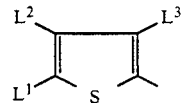

where $L^1$, $L^2$ and $L^3$ are each as defined in claim 1.

4. An azo dye as claimed in claim 1, wherein $L^2$ is chloro.

UNITED STATES PATENT AND TRADEMARK OFFICE
CERTIFICATE OF CORRECTION

PATENT NO. : 5,306,815
DATED : April 26, 1994
INVENTOR(S) : Erwin HAHN, et al.

It is certified that error appears in the above-indentified patent and that said Letters Patent is hereby corrected as shown below:

On the title page, Item [75], the 6th inventor's first name should read as follows:

--Matthias--

Signed and Sealed this

Ninth Day of August, 1994

Attest:

BRUCE LEHMAN

Attesting Officer

Commissioner of Patents and Trademarks